United States Patent
Oda et al.

(10) Patent No.: US 11,730,154 B2
(45) Date of Patent: Aug. 22, 2023

(54) FISHING ROD INCLUDING ROD BODY HAVING FITTING MOUNTED THEREON

(71) Applicant: GLOBERIDE, Inc., Tokyo (JP)

(72) Inventors: Takuya Oda, Tokyo (JP); Nobuhiro Izaki, Tokyo (JP); Takuji Kawamura, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 67 days.

(21) Appl. No.: 16/642,953

(22) PCT Filed: Oct. 29, 2018

(86) PCT No.: PCT/JP2018/040113
§ 371 (c)(1),
(2) Date: Feb. 28, 2020

(87) PCT Pub. No.: WO2019/088022
PCT Pub. Date: May 9, 2019

(65) Prior Publication Data
US 2020/0344988 A1    Nov. 5, 2020

(30) Foreign Application Priority Data

Oct. 31, 2017   (JP) ................. 2017-210505

(51) Int. Cl.
*A01K 87/04*    (2006.01)

(52) U.S. Cl.
CPC .................... *A01K 87/04* (2013.01)

(58) Field of Classification Search
CPC ........ A01K 87/04; A01K 87/00; A01K 87/02; A01K 89/00; A01K 91/02; A01K 97/00; A01K 89/015; A01K 89/017
USPC ............................................. 43/24, 25, 18.5
See application file for complete search history.

(56) References Cited

U.S. PATENT DOCUMENTS

| | | | | |
|---|---|---|---|---|
| 4,057,926 | A | * 11/1977 | Cordell, Jr. | ............ A01K 87/00 43/18.5 |
| 2006/0110599 | A1 | * 5/2006 | Honma | ............... B29C 66/3034 428/522 |
| 2011/0319564 | A1 | * 12/2011 | Corley | .................. F03D 1/0675 525/534 |

(Continued)

FOREIGN PATENT DOCUMENTS

| | | |
|---|---|---|
| JP | 60-156963 U | 10/1985 |
| JP | 2-26474 U | 2/1990 |
| JP | 2003-116417 A | 4/2003 |
| JP | 2004-194563 A | 7/2004 |
| JP | 2005-229955 A | 9/2005 |
| JP | 2005229955 A * | 9/2005 |

(Continued)

OTHER PUBLICATIONS

Extended European Search Report dated Jun. 7, 2021, issued in the corresponding European Patent Application 18874032.8. (30 pgs.).

(Continued)

*Primary Examiner* — Peter M Poon
*Assistant Examiner* — Jeffrey R Larsen
(74) *Attorney, Agent, or Firm* — K&L Gates LLP (57) ABSTRACT

A fishing rod according to an embodiment of the present invention includes a rod body, and a fitting mounted on the outer peripheral surface of the rod body via a mounting portion of the fitting. A first fixing layer is formed to encircle the mounting portion and the rod body, and a second fixing layer is formed on the outer side of the first fixing layer. A coating layer made of a resin is formed on an outer side of the second fixing layer. In an embodiment, the coating layer is formed of a resin having a tensile elongation of 40% or more and a yield strain of 7% or more, both measured in conformity to JIS K 7161:2014, and the coating layer has a thickness of 1.3 mm or smaller.

12 Claims, 7 Drawing Sheets

(56) References Cited

U.S. PATENT DOCUMENTS

| | | | | |
|---|---|---|---|---|
| 2015/0272096 A1* | 10/2015 | Yamamoto | ............ | A01K 87/00 |
| | | | | 43/22 |
| 2015/0290900 A1* | 10/2015 | Tsunashima | ............. | B32B 1/08 |
| | | | | 428/36.1 |

FOREIGN PATENT DOCUMENTS

| JP | 2007-282530 A1 | | 11/2007 | | |
|---|---|---|---|---|---|
| JP | 2008-263841 A | | 11/2008 | | |
| JP | 2009-219372 A | | 10/2009 | | |
| JP | 2012-000078 A | | 1/2012 | | |
| JP | 2013138659 A | * | 7/2013 | ............ | A01K 87/02 |
| JP | 2013138659 A | | 7/2013 | | |

OTHER PUBLICATIONS

International Preliminary Report on Patentability dated May 5, 2020 issued in corresponding International Patent Application No. PCT/JP2018/040113 with English translation (8 pages).

Office Action dated Apr. 15, 2021, issued in corresponding Chinese Patent Application No. 201880057734.X with English translation (13 pgs.).

International Search Report dated Jan. 29, 2019 issued in corresponding International Patent Application No. PCT/JP2018/040113 with English translation.

Notification of Reason for Refusal (Request for the Submission of an Opinion) dated Nov. 28, 2021, issued in corresponding Korean Patent Application No. 10-2020-7006254, with English translation (8 pgs.).

Chinese Office Action for related Chinese Application No. 201880057734.X; action dated Aug. 8, 2022; (11 pages).

Second Office Action dated Oct. 9, 2021 issued in corresponding Chinese Patent Application No. 201880057734.X, with English translation (15 pgs.).

Chinese Office Action for related Chinese Application No. 201880057734.X; action dated Apr. 6, 2022; (15 pages).

* cited by examiner

FISHING ROD INCLUDING ROD BODY HAVING FITTING MOUNTED THEREON

CROSS-REFERENCE TO RELATED APPLICATIONS

This application is the U.S. National Phase Application of PCT/JP2018/040113, filed Oct. 29, 2018, which claims the benefit of priority from Japanese Patent Application Serial No. 2017-210505, filed Oct. 31, 2017. The contents of each is incorporated herein by reference in entirety.

TECHNICAL FIELD

The present invention relates to a fishing rod including a rod body having a fitting mounted thereon.

BACKGROUND

There have been known fishing rods having fittings such as line guides and a reel seat mounted on a rod body. The fittings are conventionally mounted on a rod body with a thread or a resin sheet.

Fishing rods having fittings mounted on a rod body with a thread are disclosed in, e.g., Japanese Patent Application Publication No. 2008-263841 (Patent Literature 1) and Japanese Patent Application Publication No. 2004-194563 (Patent Literature 2).

Fishing rods having fittings mounted on a rod body with a resin sheet are disclosed in, e.g., the Japanese Utility Model Application Publication No. Sho 60-156963 (Patent Literature 3) and Japanese Utility Model Application Publication No. Hei 2-26474 (Patent Literature 4). In these Patent Literatures, the resin sheet is made of a fiber-reinforced resin.

The threads and resin sheets for mounting the fittings may be coated with synthetic resin coating to improve decorativeness and weather resistance thereof. As stated in Japanese Patent Application Publication No. 2003-116417, the synthetic resin coating is prone to cracking.

RELEVANT REFERENCES

List of Relevant Patent Literature

Patent Literature 1: Japanese Patent Application Publication No. Hei 2008-263841
Patent Literature 2: Japanese Patent Application Publication No. 2004-194563
Patent Literature 3: Japanese Utility Model Application Publication No. Sho 60-156963
Patent Literature 4: Japanese Utility Model Application Publication No. Hei 2-026474
Patent Literature 5: Japanese Patent Application Publication No. 2003-116417

SUMMARY

One object of the present invention is to control cracking in a coating layer that coats a thread or a sheet used for mounting a fitting on a rod body. Another object of the present invention is to control unintended peeling of the coating layer from the rod body and to control cracking in the coating layer caused by such peeling. Other objects of the present invention will be apparent with reference to the entire description in this specification.

A fishing rod according to an embodiment of the present invention comprises: a rod body; a fitting including a mounting portion, the fitting being mounted on an outer peripheral surface of the rod body via the mounting portion; a first fixing layer formed of a first sheet wound on the mounting portion and the rod body; a second fixing layer formed of a second sheet wound on an outer side of the first sheet, the second sheet being made of a fiber-reinforced resin; and a coating layer made of a resin and formed on an outer side of the second fixing layer. In this embodiment, the coating layer is formed of a resin having a tensile elongation of 40% or more and a yield strain of 7% or more, both measured in conformity to JIS K 7161:2014, the coating layer having a thickness of 1.3 mm or smaller.

In use of a fishing rod, a rod body sometimes bends sharply. In general, a fitting cannot fully follow the bending of the rod body, and thus a coating layer receives a stress when the rod body is bent. The coating layer, which has a high hardness, also cannot fully follow the bending of the rod body. When the rod body is bent, the coating layer receives a stress produced by itself. These stresses cause cracking in the coating layer. Further, the Inventors have found that these stresses cause peeling between the coating layer and the rod body, and moisture absorption at the site of the peeling changes the physical properties of the coating layer, also resulting in cracking.

According to the above embodiment, the coating layer is made of a resin having a tensile elongation and a yield strain within the above respective ranges and is formed to have the above thickness. Therefore, the coating layer can withstand the stresses produced by the fitting and the coating layer itself. In addition, it is also possible to control the change in the physical properties of the coating layer caused by the peeling of the coating layer. As a result, cracking in the coating layer can be controlled. As described above, in the fishing rod according to the embodiment of the present invention, cracking in the coating layer can be controlled by the above two mechanisms and the combined effects thereof.

In an embodiment of the present invention, the coating layer has a tensile elasticity of 13 MPa to 420 MPa measured in conformity to JIS K 7161:2014.

According to the above embodiment, the coating layer has a tensile elasticity of 13 MPa to 420 MPa. Therefore, cracking in the coating layer can be controlled even when the rod body is bent to impart a stress on the coating layer.

In an embodiment of the present invention, the adhesive strength between the coating layer and the second fixing layer measured in conformity to JIS K 6849:1994 is 88 $N/cm^2$ or more.

According to the above embodiment, the adhesive strength between the coating layer and the second fixing layer is 88 $N/cm^2$ or more. Therefore, it is possible to control peeling of the coating layer from the second fixing layer even when the rod body is bent to impart a stress on the coating layer. The peeling of the coating layer from the second fixing layer may cause cracking in the coating layer. Therefore, cracking in the coating layer can be controlled by preventing the peeling of the coating layer from the second fixing layer.

In an embodiment of the present invention, the coating layer includes a first coating layer and a second coating layer, the first coating layer being made of a resin and formed on the outer side of the second fixing layer, the second coating layer being made of a resin and formed on the outer side of the first coating layer.

According to the embodiment, the coating layer, which has the above thickness, can be formed of thinner layers than in the case where the coating layer is formed of a single layer. More specifically, the thicknesses of the first coating layer and the second coating layer can be smaller than the thickness of the single layer that alone constitutes the coating layer. This arrangement reduces the residual stresses in the first coating layer and the second coating layer, thereby controlling the peeling of the coating layer. As a result, cracking in the coating layer can be controlled.

In an embodiment of the present invention, the coating layer is formed such that an interval between a front end of the coating layer and a front end of the second fixing layer is 3.0 mm or smaller. In another embodiment of the present invention, the coating layer is formed such that an interval between a rear end of the coating layer and a rear end of the second fixing layer is 1.0 mm or smaller.

According to a study of the Inventors, the coating layer is prone to cracking in the front projecting portion extending frontward beyond the front end of the second fixing layer and the rear projecting portion extending rearward beyond the rear end of the second fixing layer. According to the above embodiment, the portion of the coating layer extending frontward beyond the front end of the second fixing layer has a width of 3.0 mm, and the portion of the coating layer extending rearward beyond the rear end of the second fixing layer has a width of 1.0 mm, such that cracking in the front projecting portion and the rear projecting portion can be controlled.

The fishing rod according to an embodiment of the present invention further comprises a primer layer provided between the first sheet and the mounting portion. Thus, the peeling of the mounting portion from the rod body can be controlled.

Advantages

According to the above embodiments of the present invention, cracking in the coating layer can be controlled.

DESCRIPTION OF THE EMBODIMENTS

Embodiments of the fishing rod according to the present invention will be hereinafter described with reference to the appended drawings. Elements common to a plurality of drawings are denoted by the same reference signs throughout the plurality of drawings. It should be noted that the drawings do not necessarily appear to an accurate scale for convenience of explanation.

Figure 1:
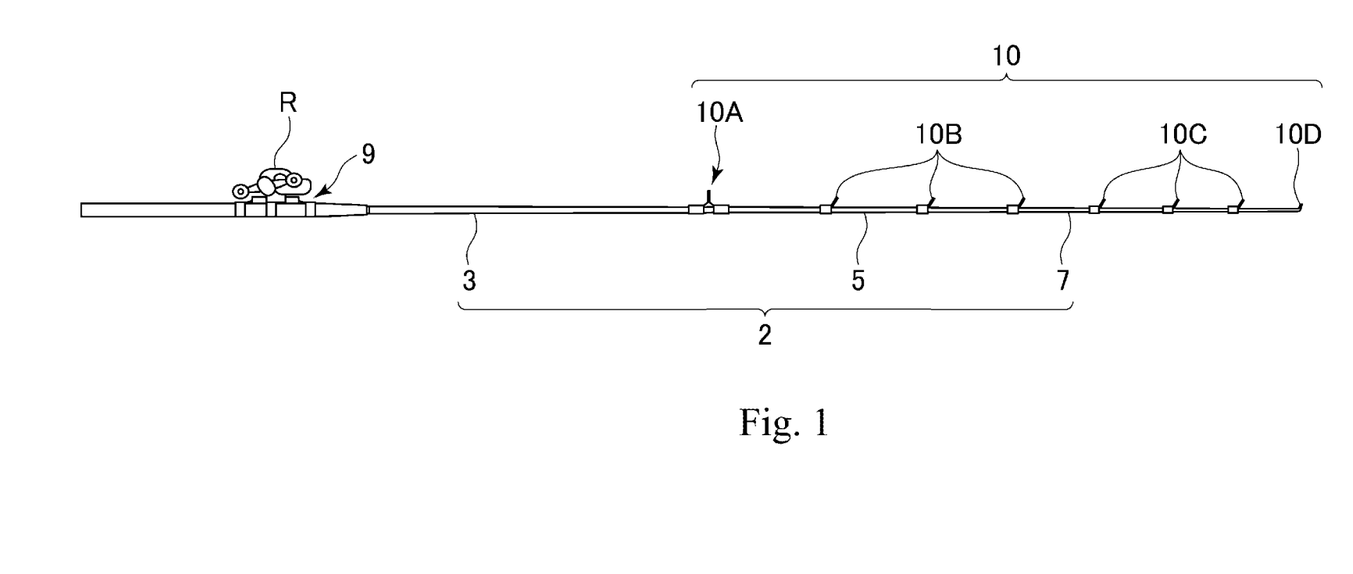
FIG. 1 shows a fishing rod according to an embodiment of the present invention.

FIG. 1 shows an embodiment of the fishing rod according to the present invention. As shown, the fishing rod 1 according to an embodiment of the present invention includes a rod body 2, a reel R mounted on the rod body 2 via a reel seat 9, and fishing line guides 10 mounted on the rod body 2. In the embodiment shown, the reel seat 9 and the fishing line guides 10 are fittings mounted on the outer peripheral surface of the rod body.

The rod body 2 is made up of, for example, a butt rod 3, an intermediate rod 5, and a tip rod 7 connected together. For example, these rods are jointed together by ordinary jointing. The butt rod 3, the intermediate rod 5, and the tip rod 7 may also be jointed together by telescopic jointing, inverse ordinary jointing, spigot jointing, or any other known jointing methods. Alternatively, the rod body 2 may be made of a single rod.

The butt rod 3, the intermediate rod 5, and the tip rod 7 are formed of, for example, a tube made of a fiber-reinforced resin. The tube made of a fiber-reinforced resin can be formed by preparing a fiber-reinforced resin prepreg (a prepreg sheet) made of reinforcement fibers impregnated with a matrix resin, winding the prepreg sheet on a core, and heating and curing the prepreg sheet. The reinforcement fibers included in the prepreg sheet may be, for example, carbon fibers, glass fibers, or any other known reinforcement fibers. The matrix resin included in the prepreg sheet may be a thermosetting resin such as epoxy resin. After the prepreg sheet is cured, the core is removed. The outer surface of the tube may be polished as necessary. Each of the rods may be formed solid.

In the embodiment shown, the butt rod 3, the intermediate rod 5, and the tip rod 7 are provided with a plurality of fishing line guides 10 (the fishing line guides 10A to 10D) for guiding a fishing line released from the reel R mounted to the reel seat 9. More specifically, the butt rod 3 is provided with the fishing line guide 10A, the intermediate rod 5 is provided with the fishing line guides 10B, and the tip rod 7 is provided with the fishing line guides 10C. The top guide 10D is provided at a distal end of the tip rod 7.

In the embodiment shown, the reel seat 9 is mounted on the outer peripheral surface of the butt rod 3.

Figure 2:
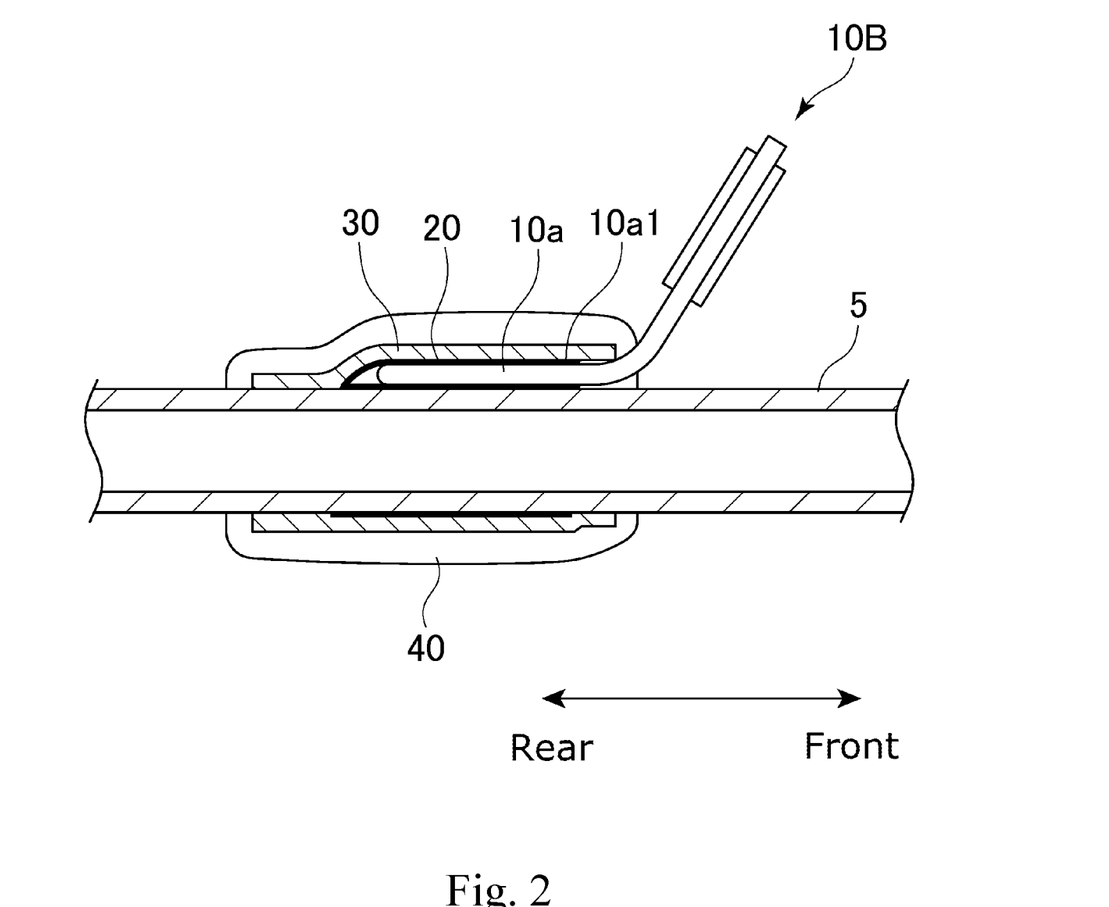
FIG. 2 is a sectional view schematically showing a section of the fishing rod of FIG. 1, the fishing rod being cut along a plane extending through the central axis of the fishing rod.
Figure 3:
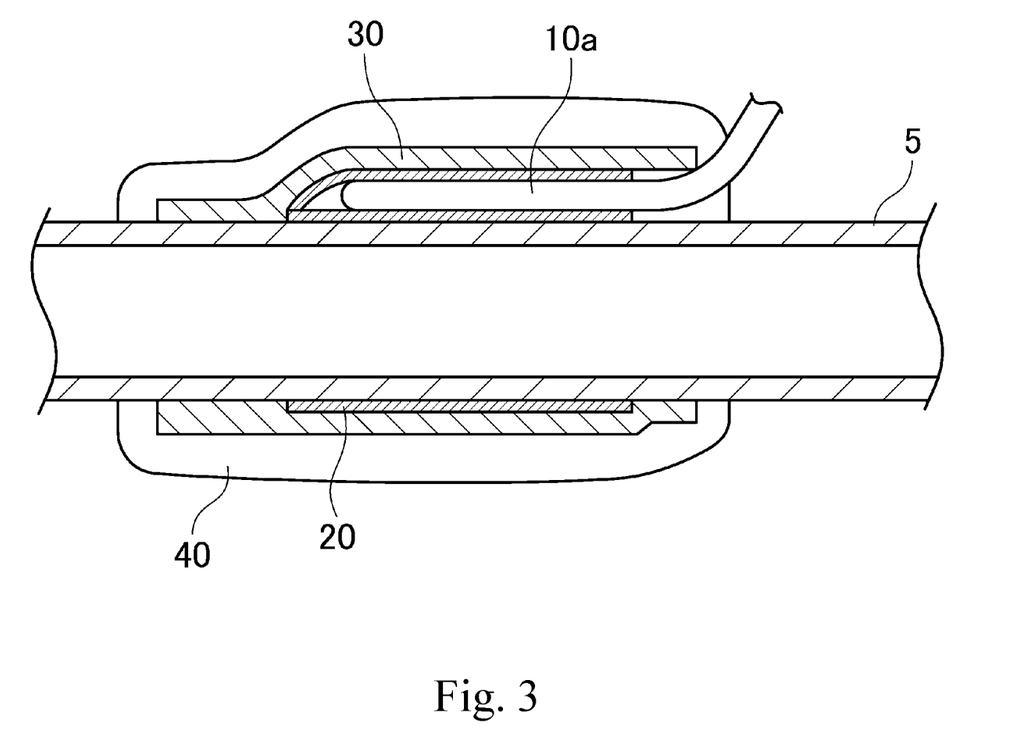
FIG. 3 is an enlarged sectional view showing a part of the fishing rod of FIG. 2 in an enlarged scale.

With reference to FIGS. 2 and 3, a further description is given of how the fishing line guides are mounted on the rod body. These drawings illustrate one of the fishing line guides 10B mounted on the intermediate rod 5. The fishing line guides other than the fishing line guides 10B (for example, the fishing line guides 10A, 10C, and 10D) can also be mounted on the associated rods in the same manner as the fishing line guides 10B.

FIG. 2 is a sectional view schematically showing a section of the fishing rod of FIG. 1, the fishing rod being cut along a plane extending through the central axis of the fishing rod, and FIG. 3 is an enlarged sectional view showing a part of the fishing rod of FIG. 2 in an enlarged scale. As shown in these drawings, the fishing line guide 10B has a foot 10a extending along the axis of the intermediate rod 5 and is mounted on the outer peripheral surface of the intermediate rod 5 via the foot 10a. On the outer side of the foot 10a of the fishing line guide 10B, there are provided a first fixing layer 20, a second fixing layer 30, and a coating layer 40. The terms "outer side" and "inner side" refer to "the outer side" and "the inner side" in the radial direction of the intermediate rod 5, respectively, unless otherwise construed from the context. In this way, the fishing line guide 10B is mounted on the outer peripheral surface of the intermediate rod 5 via the foot 10a with the first fixing layer 20, the second fixing layer 30, and the coating layer 40.

Figure 7:
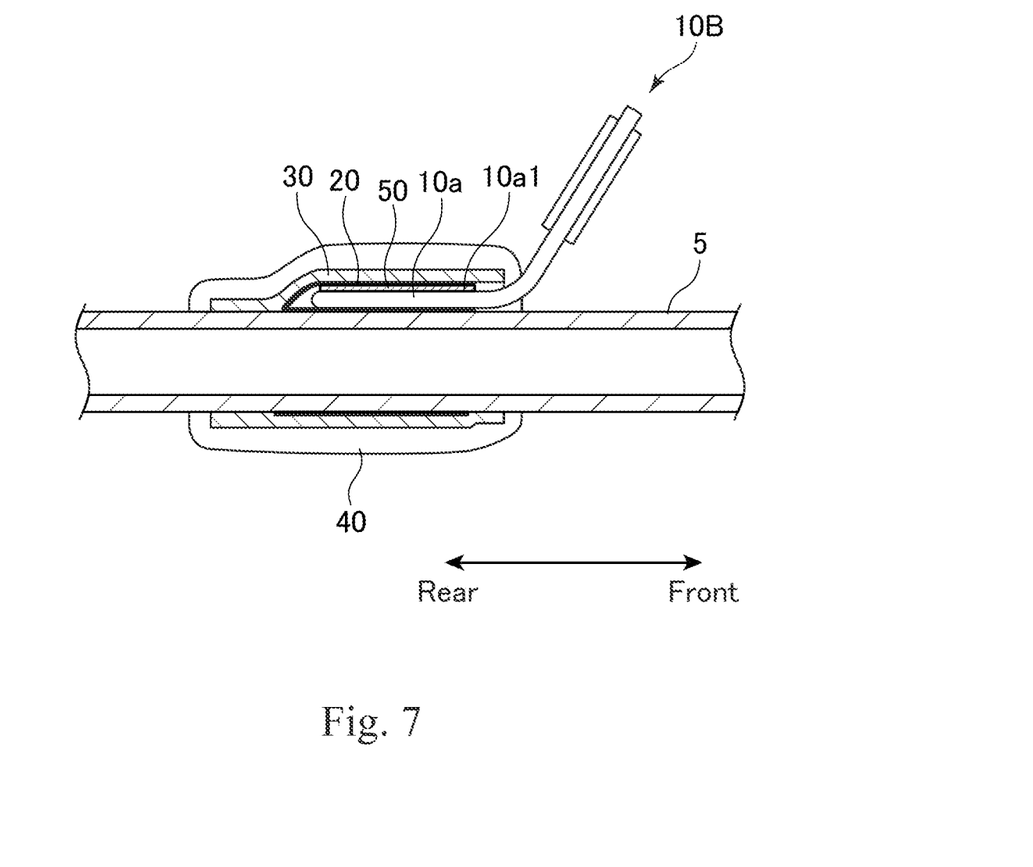
FIG. 7 is a sectional view schematically showing a section of the fishing rod of FIG. 1 according to another embodiment.

The stacking structure shown in FIG. 2 is an example, and the fishing rod of the present invention may include various layers other than those shown in FIG. 2. For example, as shown in FIG. 7, a primer layer 50 may be applied to the surface of the foot 10a. This primer 50 may be epoxy, urethane, or any other known primer. The primer layer 50 is disposed, for example, between the upper surface 10a1 of the foot 10a and the first fixing layer 20. This allows the first fixing layer 20 to be attached more firmly to the foot 10a via the primer layer 50. It is also possible that an anchor layer for improving the tightness be provided between the first fixing layer 20 and the second fixing layer 30.

The first fixing layer 20 is provided to cover a portion of the outer peripheral surface of the foot 10a and the intermediate rod 5. In an embodiment, the first fixing layer 20 is provided to cover the entire foot 10a in the axial direction of the intermediate rod 5. In other words, the first fixing layer 20 covers the region from the front end to the rear end of the foot 10a. Herein, the tip side of the fishing rod 1 is referred to as "front" or "front side," and the butt side thereof is referred to as "rear" or "rear side," unless otherwise construed from the context. For the portion where the rod body and the fitting are fixed to each other by the first fixing layer and the second fixing layer, the term "front end" refers to the end of the portion distal from the middle of the fitting, and the term "rear end" refers to the end of the portion proximal to the middle of the fitting. For example, when the fitting is a single-foot fishing line guide, the term "front end" refers to the distal end of the foot of the fishing line guide, and when the fitting is a double-foot fishing line guide, the term "front end" refers to both distal ends of the feet of the fishing line guide. The term "rear end" refers to the end of the foot on the opposite side to the "front end" In another embodiment, the first fixing layer 20 is provided to cover a part of the foot 10a in the axial direction of the intermediate rod 5. As will be described later, the first fixing layer 20 is formed of a first sheet 20S.

The second fixing layer 30 is provided on the outer side of the first fixing layer 20 so as to cover the first fixing layer 20. In an embodiment, the second fixing layer 30 is provided to cover the entire first fixing layer 20 in the axial direction of the intermediate rod 5. In other words, the second fixing layer 30 covers the region from the front end to the rear end of the first fixing layer 20. As will be described later, the second fixing layer 30 is formed of a second sheet 30S.

The coating layer 40 is a coating film made of resin provided on the outer side of the second fixing layer 30 so as to cover the second fixing layer 30. As shown, the coating layer 40 may be provided to coat the entire second fixing layer 30.

The coating layer 40 may be formed of various resin materials such as epoxy, urethane, acrylic, or UV-curable resins (e.g., urethane acrylate, acrylic resin acrylate, epoxy acrylate). The materials of the coating layer 40 are not limited to those named herein but are various. The coating layer 40 may be either transparent or colored.

The coating layer may be either formed of a single layer or formed of a plurality of layers stacked in the radial direction of the intermediate rod 5.

In an embodiment of the present invention, the coating layer 40 is formed on the outer side of the second fixing layer 30 to have a generally constant thickness. The thickness T1 of the coating layer 40 is 1.3 mm or smaller. When the thickness of the coating layer 40 is uneven, the thickness of the coating layer 40 at its thickest portion is 1.3 mm or smaller. In an embodiment of the present invention, the thickness of the coating layer 40 is preferably 0.1 mm or larger, more preferably 0.3 mm or larger, still more preferably 0.5 mm or larger, and most preferably 0.8 mm or larger. The coating layer 40 having a thickness equal to or greater than a given thickness can further control peeling.

In an embodiment of the present invention, the coating layer 40 has a tensile elongation of 40% or more and a yield strain of 7% or more, both measured in conformity to JIS K 7161:2014. Since the coating layer 40 has a tensile elongation of 40% or more, cracking in the coating layer 40 can be controlled even when the intermediate rod 5 is bent. Further, since the coating layer 40 has a yield strain of 7% or more, deformation of the coating layer 40 can be controlled even when the intermediate rod 5 is bent repeatedly. The tensile elongation is herein determined by the following formula: Tensile elongation=$(L_2-L_0)/L_0 \times 100\%$, where $L_0$ is the length of the test piece not under tension, and $L_2$ is the length of the test piece at the time when it is broken under tension. The yield strain is herein determined by the following formula: Yield strain=$(L_1-L_0)/L_0 \times 100\%$, where $L_0$ is the length of the test piece not under tension, and $L_1$ is the length of the test piece at the time when it reaches the yield point under tension.

In an embodiment of the present invention, the coating layer 40 has a tensile elasticity of 13 MPa to 420 MPa measured in conformity to JIS K 7161:2014. Since the coating layer 40 has a tensile elasticity of 13 MPa or more, cracking in the coating layer 40 can be controlled even when the intermediate rod 5 is bent.

In an embodiment of the present invention, the adhesive strength between the coating layer 40 and the second fixing layer 30 measured in conformity to JIS K 6849:1994 is 88 $N/cm^2$ or more. Since the adhesive strength between the coating layer 40 and the second fixing layer 30 is 88 $N/cm^2$ or more, it is possible to control peeling of the coating layer 40 from the second fixing layer 30 caused by bending of the intermediate rod 5. Thus, cracking in the coating layer 40 can be controlled.

Figure 4:
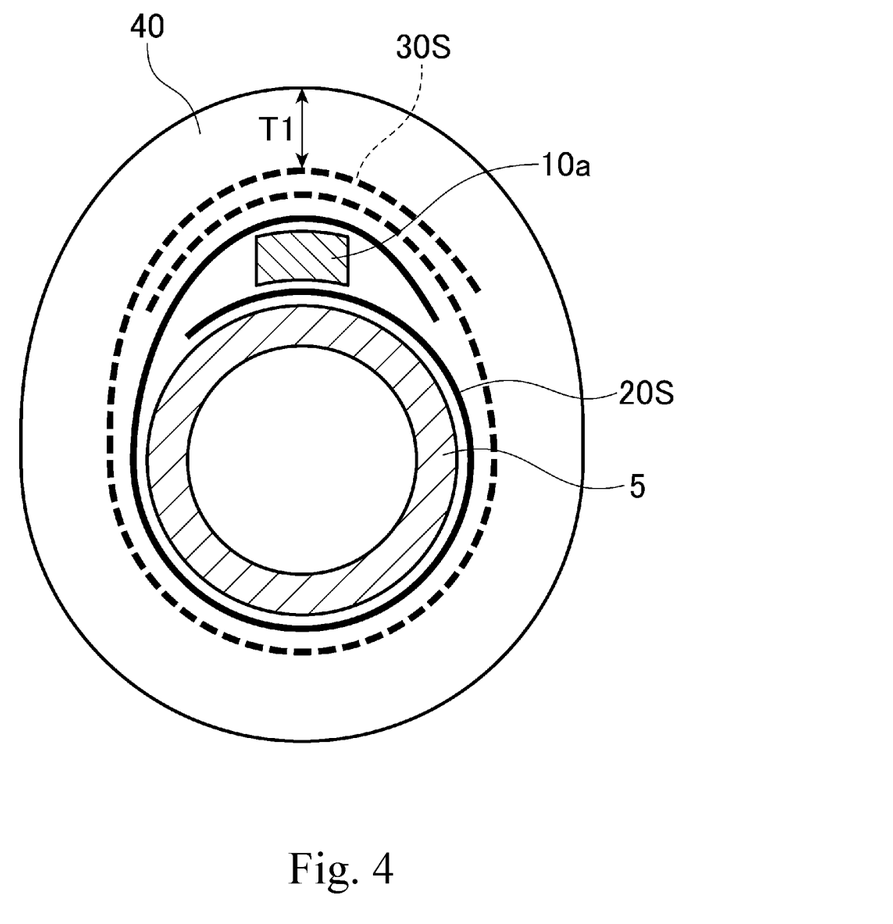
FIG. 4 schematically shows a method of mounting a fishing line guide on a rod body.
Figure 5:
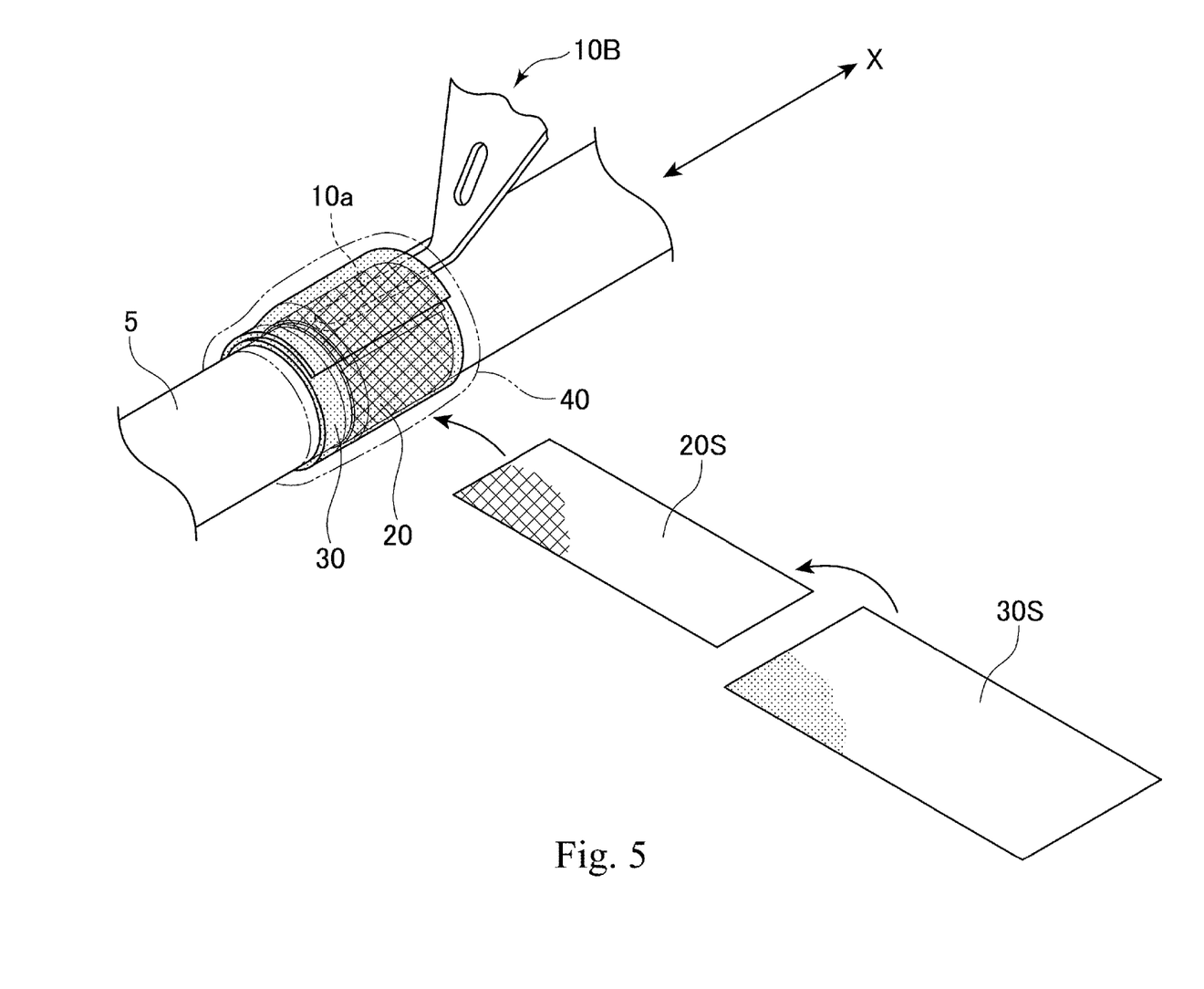
FIG. 5 schematically shows a method of mounting a fishing line guide on a rod body.

Next, with further reference to FIGS. 4 and 5, a description is given of how the fishing line guides 10B are mounted on the rod 5. FIGS. 4 and 5 schematically shows a part of a method of mounting a fishing line guide 10B on the rod 5. FIG. 4 schematically shows a section of the intermediate rod 5 cut along a plane perpendicular to the central axis of the intermediate rod 5. FIG. 5 is a perspective view of the rod 5.

The process of mounting the fishing line guide 10B on the intermediate rod 5 begins with preparing the rod 5, the fishing line guide 10B, the first sheet 20S, and the second sheet 30S.

As described above, the rod 5 is made by heating and curing a prepreg sheet wound on a core.

The fishing line guide 10B may be any fixed guide. The fishing line guide 10B may be either a single-foot guide as shown or a double-foot guide.

The first sheet 20S is, for example, a prepreg sheet made of synthetic resin fibers impregnated with a resin composition containing a thermosetting resin. The synthetic resin fibers are, for example, fibers of one or more types selected from the group consisting of polyolefin, polyamide, polyacrylonitrile, and polyester. A thermosetting resin cures irreversibly by chemical reaction upon heating. Thermosetting resins that can be used in the above resin composition include, for example, urea resins, melamine resins, phenolic resins, epoxy resins, unsaturated polyester resins, alkyd resins, and urethane resins. The first sheet 20S has a thickness of, for example, 20 µm to 300 µm. The first sheet 20S may be a commercially available sheet that can be used suitably.

The amount of the thermosetting resin contained in the first sheet 20S is, for example, 50 wt % or more, or 60 wt % or more, relative to 100 wt % of the total mass of the reinforcement fibers and the thermosetting resin in the first sheet 20S.

The reinforcement fibers contained in the first sheet 20S may be arranged regularly at an angle with respect to the central axis direction X of the rod body 2. For example, the reinforcement fibers contained in the first sheet 20S may be arranged regularly at 450 with respect to the central axis direction X of the rod body 2. The reinforcement fibers contained in the first sheet 20S may be plain-woven.

In an embodiment of the present invention, the first sheet 20S has a tensile elongation of 15% or more, 18% or more, 19% or more, or 20% or more measured in conformity to JIS K 7161-1.

In an embodiment of the present invention, the first sheet 20S has a tensile elasticity of 980 to 3500 MPa, 1100 to 3300 MPa, 1500 to 3100 MPa, or 2000 to 2800 MPa measured in conformity to JIS K 7161-1.

In an embodiment of the present invention, the first sheet 20S has a tensile breaking strength of 20 to 280 MPa, 30 to 260 MPa, 40 to 250 MPa, or 58 to 200 MPa measured in conformity to JIS K 7161:2014.

The second sheet 30S is, for example, a prepreg sheet made of reinforcement fibers impregnated with a composition containing a thermosetting resin. The reinforcement fibers may include, for example, carbon fibers and glass fibers. Thermosetting resins that can be used in the above composition contained in the second sheet 30S include, for example, urea resins, melamine resins, phenolic resins, epoxy resins, unsaturated polyester resins, alkyd resins, and urethane resins.

In an embodiment of the present invention, the curing temperature of the thermosetting resin contained in the resin composition of the second sheet 30S is lower than that of the thermosetting resin contained in the resin composition of the first sheet 20S. For example, when an epoxy resin that cures at 120° C. is used as the thermosetting resin contained in the resin composition of the first sheet 20S, an epoxy resin that cures at 80° C. may be used as the thermosetting resin in the second sheet 30S. The second sheet 30S may have a thickness of, for example, 20 µm to 300 µm. The second sheet 30S may be a commercially available sheet that can be used suitably.

The amount of the thermosetting resin contained in the second sheet 30S is, for example, 20 to 50 wt % or 30 to 40 mass %, relative to 100 wt % of the total mass of the reinforcement fibers and the thermosetting resin in the second sheet 30S.

The fibers contained in the second sheet 30S may be plain-woven. The fibers contained in the second sheet 30S may be oriented, for example, at 0° and 90° with respect to the central axis direction X.

The resin composition contained in the first sheet 20S or the second sheet 30S contains a thermosetting resin as the main component. This resin composition may contain a known additive. When the resin composition contains the thermosetting resin and the additive, the proportion of the mass of the thermosetting resin relative to 100% of the entire mass of the resin composition is, for example, 50% or more, 60% or more, 70% or more, 80% or more, or 90% or more.

At least one of the first sheet 20S and the second sheet 30S may be a resin sheet not containing the reinforcement fibers. Such a resin sheet is, for example, a resin sheet containing the thermosetting resin as the base material.

As shown in FIG. 4, the first step to mount the fishing line guide 10B on the rod 5 is to place one end of the first sheet 20S on the outer peripheral surface of the intermediate rod 5 and place the foot 10a of the fishing line guide 10B on the first sheet 20S placed on the surface of the intermediate rod. Next, the first sheet 20S is wound for 1.3 plies so as to encircle the outer peripheral surface of the rod 5. Thus, as shown, the foot 10a is covered by the first sheet 20S along with the rod 5. In another aspect, it is also possible to place the foot 10a directly on the surface of the rod 5 and then wind the first sheet 20S around the rod 5 so as to encircle the foot 10a and the outer peripheral surface of the rod 5.

Next, the second sheet 30S is wound on the first sheet 20S that is wound on the rod 5, so as to form a winding. The second sheet 30S is wound around the rod 5 for 1.3 plies so as to cover the first sheet 20S.

The number of turns of the first sheet 20S and the second sheet 30S is not limited to that expressly mentioned herein. The first sheet 20S and the second sheet 30S may be wound for any number of plies. For example, the first sheet 20S and the second sheet 30S may be each wound for two or more plies.

Next, the winding formed of the first sheet 20S and the second sheet 30S wound around the rod 5 is heated, thereby to cure the thermosetting resin contained in the first sheet 20S to form the first fixing layer 20, and to cure the thermosetting resin contained in the second sheet 30S to form the second fixing layer 30. The first fixing layer 20 and the second fixing layer 30 fix the fishing line guide 10B to the rod 5.

The above step of heating the winding may be carried out with a known heating furnace. For example, the winding may be placed for a predetermined period in a heating furnace maintained at a predetermined temperature, such that the winding is heated enough to produce the first fixing layer 20 and the second fixing layer 30. The temperature of the heating furnace is, for example, 70 to 170° C., 80 to 160° C., 85 to 150° C., or 90 to 120° C., but the heating is possible at a temperature other than these ranges in accordance with the curing temperature of the thermosetting resin. The heating time of the winding in the heating furnace is, for example, 5 minutes to 3 hours, 15 minutes to 2.5 hours, or 30 minutes to 2 hours, but the winding may be heated for a heating time other than these ranges. During the heating of the winding, a securing tape may be wound around the winding so as to prevent movement of the first sheet 20S and the second sheet 30S wound around the intermediate rod 5.

When the curing temperature of the thermosetting resin contained in the second sheet 30S is higher than that of the thermosetting resin contained in the first sheet 20S, the thermosetting resin of the second sheet 30S on the outer side is cured first, and then the thermosetting resin of the first sheet 20S having the higher curing temperature is cured.

After heated for the predetermined period, the winding is taken out of the heating furnace and cooled at a room temperature for a predetermined period. The winding is cooled enough, and then the coating layer 40 is formed so as to cover the second fixing layer 30 formed in the winding. More specifically, a resin composition such as epoxy, urethane, or acrylic is applied so as to cover the second fixing layer 30, and the applied resin composition is heated and cured to form the coating layer 40.

In an embodiment of the present invention, the first sheet 20S for forming the first fixing layer 20 has a larger tensile elongation than the second sheet 30S for forming the second fixing layer 30. Thus, the first fixing layer 20 formed by curing the first sheet 20S has a larger tensile elongation than the second fixing layer 30 formed by curing the second sheet 30S.

The process of replacing the fishing line guide 10B fixed to the intermediate rod 5 by the first fixing layer 20 and the second fixing layer 30 with a new fishing line guide begins with peeling the fishing line guide 10B from the intermediate rod 5. At this time, the foot 10a is pulled in the direction away from the outer peripheral surface of the intermediate rod 5, and therefore, a tensile stress acts on the first fixing layer 20 and the second fixing layer 30. When the first fixing layer 20 has a larger tensile elongation than the second fixing layer 30, the first fixing layer 20 is not broken even if a tensile stress enough to break the second fixing layer 30 acts on the first fixing layer 20 and the second fixing layer 30. Therefore, the fishing line guide 10B can be peeled off by a force enough to break the second fixing layer 30. Since the second fixing layer 30 is provided on the outer side of the first fixing layer 20, the second fixing layer 30 can be removed along with the first fixing layer 20 if the first fixing layer 20 is not broken. When the second fixing layer 30 remains on the intermediate rod 5, it is necessary to remove the remainder of the second fixing layer 30, and thus the work efficiency in replacing the fishing line guide 10B is reduced. Since the first fixing layer 20 has a larger tensile elongation than the second fixing layer 30, the second fixing layer 30 can be prevented from remaining on the intermediate rod 5, and as a result, it can be prevented that the work efficiency in replacing the fishing line guide 10B be reduced.

When the tensile elongation of the first sheet 20S is 15%, it is possible to prevent breakage of the first fixing layer 20 due to the tensile stress received in replacing the fishing line guide 10B.

When the tensile elasticity of the first sheet 20S is within the range of 980 to 3500 MPa, it is possible to more securely prevent breakage of the first fixing layer 20 due to the tensile stress received in replacing the fishing line guide 10B.

When the tensile breaking strength of the first sheet 20S is within the range of 20 to 280 MPa, it is possible to more securely prevent breakage of the first fixing layer 20 due to the tensile stress received in replacing the fishing line guide 10B.

The fishing line guides 10 other than the fishing line guides 10B can also be mounted on the associated rods in the same manner as described for the fishing line guides 10B. For example, the fishing line guide 10A is mounted on the butt rod 3 by the first fixing layer 20, the second fixing layer 30, and the coating layer 40.

The reel seat 9 can also be mounted on the associated rod in the same manner as described for the fishing line guides 10B. For example, the reel seat 9 is mounted on the butt rod 3 by the first fixing layer 20, the second fixing layer 30, and the coating layer 40.

Figure 6:
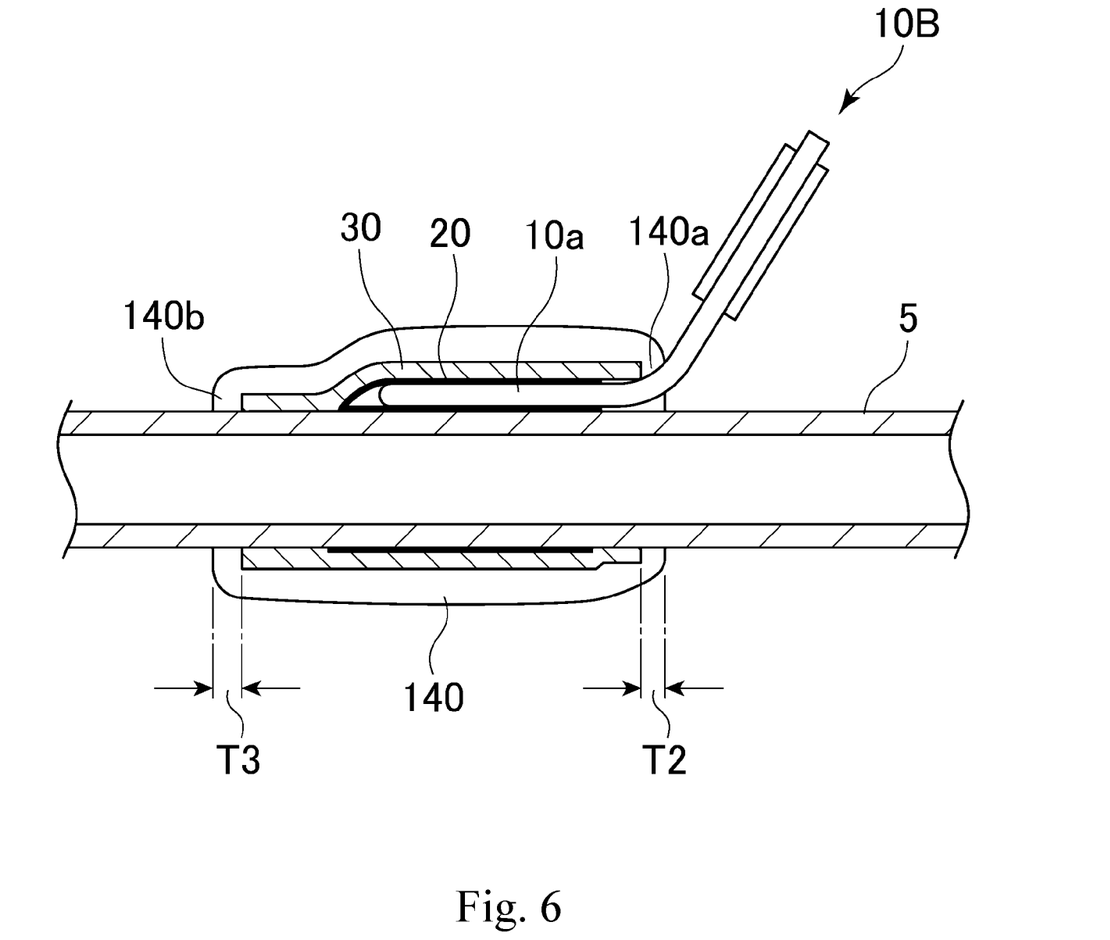
FIG. 6 is a sectional view schematically showing a section of the fishing rod according to another embodiment of the present invention, the fishing rod being cut along a plane extending through the central axis of the fishing rod.

Next, with reference to FIG. 6, a description is given of a fishing rod according to another embodiment of the present invention. The foot 10a of the fishing line guide 10B shown in FIG. 6 is different than in the embodiment shown in FIG. 2 in that it is covered by a coating layer 140 instead of the coating layer 40.

The coating layer 140 is formed of the same resin materials as the coating layer 40. The coating layer 140 includes a front projecting portion 140a and a rear projecting portion 140b. The front projecting portion 140a projects frontward beyond the front end of the second fixing layer 30, and the rear projecting portion 140b projects rearward beyond the rear end of the second fixing layer 30.

The coating layer 140 is provided such that the interval T2 between the front end of the coating layer 140 and the front end of the second fixing layer 30 is 1.0 mm or smaller. In other words, the width T2 of the front projecting portion 140a in the font-rear direction is 1.0 mm or smaller. Further, the coating layer 140 is provided such that the interval T3 between the rear end of the coating layer 140 and the rear end of the second fixing layer 30 is 3.0 mm or smaller. In other words, the width T3 of the rear projecting portion 140b in the font-rear direction is 3.0 mm or smaller.

The coating layer 140 is prone to cracking in the portion extending frontward beyond the front end of the second fixing layer 30 (that is, the front projecting portion 140a) and the portion extending rearward beyond the rear end of the second fixing layer 30 (that is, the rear projecting portion 140b). According to the above embodiment, the width of the front projecting portion 140a is 1.0 mm or smaller, and the width of the rear projecting portion 140b in the front-rear direction is 3.0 mm or smaller. Therefore, cracking in the front projecting portion 140a and the rear projecting portion 140b can be controlled.

EXAMPLES

A test was performed to investigate the durability of a fishing rod having a fitting mounted on a rod body. First, in a preliminary test, test pieces formed of the same resins as the coating layer was prepared, and physical properties of the test pieces such as tensile elongation and yield strain were measured in conformity to JIS K 7161:2014 (Samples 1 to 2 and Comparative Sample 1). The results are listed in Table 1 below.

TABLE 1

|  | Sample 1 | Sample 2 | Comparative Sample 1 |
| --- | --- | --- | --- |
| Average Thickness (mm) | 2.15 | 2.05 | 2.09 |
| Tensile Elongation (%) | 96.9 | 40.2 | 109.0 |
| Yield Strain (%) | 7.0 | 11.9 | 2.0 |
| Tensile Elasticity (MPa) | 13.3 | 419.5 | 4.5 |
| Adhesive Strength (N/cm2) | 137.8 | 89.8 | 31.9 |

Next, fishing line guides (fittings) were mounted on the rod body with the coating layers formed of the same resins as Samples 1 to 2 and Comparative Sample 1. Table 2 shows the results of durability test performed on the fishing rod obtained (Examples 1 to 2 and Comparative Examples 1 to 2). In the durability test, the fishing line guides were oriented in the horizontal direction, weighted with a 7 kg load, and repeatedly raised to an angle of 45°. Table 2 shows the numbers of times of the raising operation at which peeling occurred between the fishing line guides and the rod body. Examples 1 and 2 did not experience the peeling between the fishing line guides and the rod body even after 600 times of the raising operation. These Examples are rated as acceptable, symbolized by "A," as opposed to those rated as unacceptable, symbolized by "B."

TABLE 2

|  | Example 1 | Example 2 | Comparative Example 1 | Comparative Example 2 |
| --- | --- | --- | --- | --- |
| Resin | Sample 1 | Sample 2 | Comparative Sample 1 | Sample 1 |
| Thickness of Coating Layer (mm) | 0.85 | 1.20 | 0.85 | 1.50 |

TABLE 2-continued

|  | Example 1 | Example 2 | Comparative Example 1 | Comparative Example 2 |
|---|---|---|---|---|
| Number of Times Endured | >600 | >600 | 100 | 250 |
| Durability Rating | A | A | B | B |

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

LIST OF REFERENCE NUMBERS 1 fishing rod
2 rod body
3 butt rod
5 intermediate rod
7 tip rod
9 reel seat
10 fishing line guide
20 first fixing layer
30 second fixing layer
20S first sheet
30S second sheet
40, 140 coating layer

What is claimed is:

1. A fishing rod comprising:
a rod body extending in an axial direction;
a fitting including a mounting portion, the fitting being mounted on an outer peripheral surface of the rod body via the mounting portion;
a first fixing layer formed of a first sheet wound on the mounting portion and the rod body;
a second fixing layer formed of a second sheet wound on an outer side of the first sheet, the second sheet being made of a fiber-reinforced resin; and
a coating layer having a generally constant thickness and directly covering an entire outer side of the second fixing layer,
wherein the coating layer is formed of a resin having a tensile elongation of 40% or more and a yield strain of 7% or more, both measured in conformity to JIS K 7161:2014, and the coating layer has a thickness of 1.3 mm or smaller,
wherein the first sheet has a first portion and a second portion, the first portion and the second portion are overlapped with each other in a radial direction of the rod body, wherein the first sheet comprises a single continuous sheet, and the first portion and the second portion are a part of the single continuous sheet;
wherein the fitting is mounted between the first portion and the second portion of the first sheet, and
wherein the coating layer includes a first coating layer and a second coating layer, the first coating layer being made of the resin and formed on the outer side of the second fixing layer, the second coating layer being made of the resin and formed on an outer side of the first coating layer.

2. The fishing rod of claim 1, wherein the coating layer has a tensile elasticity of 13 MPa to 420 MPa measured in conformity to JIS K 7161:2014.

3. The fishing rod of claim 1, wherein an adhesive strength between the coating layer and the second fixing layer measured in conformity to JIS K 6849:1994 is 88 N/cm$^2$ or more.

4. The fishing rod of claim 1, wherein the coating layer is formed such that an interval between a front end of the coating layer and a front end of the second fixing layer is 3.0 mm or smaller.

5. The fishing rod of claim 1, wherein the coating layer is formed such that an interval between a rear end of the coating layer and a rear end of the second fixing layer is 1.0 mm or smaller.

6. The fishing rod of claim 1, further comprising a primer layer provided between the first sheet and the mounting portion.

7. The fishing rod of claim 1, wherein the thickness of the coating layer is 0.1 mm to 1.3 mm.

8. The fishing rod of claim 7, wherein the thickness of the coating layer is 0.3 mm to 1.3 mm.

9. The fishing rod of claim 8, wherein the thickness of the coating layer is 0.5 mm to 1.3 mm.

10. The fishing rod of claim 9, wherein the thickness of the coating layer is 0.8 mm to 1.3 mm.

11. The fishing rod of claim 1, wherein the yield strain of the resin of the coating layer is 7.0% to 11.9%.

12. The fishing rod of claim 1, wherein the tensile elongation of the resin of the coating layer is 40% to 96.9%.

* * * * *